(12) United States Patent
Kim et al.

(10) Patent No.: US 9,282,584 B2
(45) Date of Patent: Mar. 8, 2016

(54) CELLULAR COMMUNICATION SYSTEM ALLOWING, BY USING A UNIVERSAL LINK, DIRECT COMMUNICATION BETWEEN TERMINALS OR SIMULTANEOUS TRANSMISSION AND RECEPTION OF SIGNALS BETWEEN A BASE STATION AND THE TERMINALS

(71) Applicant: Electronics and Telecommunications Research Institute, Daejeon (KR)

(72) Inventors: Keun Young Kim, Gyeonggi-do (KR); Seung-Hwan Lee, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 13/851,541

(22) Filed: Mar. 27, 2013

(65) Prior Publication Data
US 2013/0344879 A1 Dec. 26, 2013

(30) Foreign Application Priority Data

Jun. 25, 2012 (KR) .................. 10-2012-0067895

(51) Int. Cl.
*H04W 72/00* (2009.01)
*H04W 76/02* (2009.01)
(Continued)

(52) U.S. Cl.
CPC .......... *H04W 76/023* (2013.01); *H04W 72/042* (2013.01); *H04W 72/0406* (2013.01); *H04W 16/26* (2013.01)

(58) Field of Classification Search
CPC ............ H04W 76/023; H04W 72/042; H04W 72/0406; H04W 76/02; H04W 72/04; H04W 4/005; H04W 4/08; H04W 40/22; H04W 40/24; H04W 40/248; H04W 84/045; H04W 84/047; H04W 88/00; H04W 88/02; H04W 16/26; H04W 72/0413; H04W 76/021; H04W 76/025; H04W 72/048; H04B 2201/696; H04B 2201/698

USPC ................ 455/7, 11.1, 41.2, 434, 450, 455/452.1–452.2, 500, 502, 509, 517, 522, 455/550.1, 561; 370/252, 245–246, 274, 370/310, 315, 319–321, 328–330, 337–338, 370/341, 344–345, 347, 350

See application file for complete search history.

(56) References Cited

U.S. PATENT DOCUMENTS 6,785,511 B1 * 8/2004 Hengeveld et al. ............. 455/16
8,937,897 B2 * 1/2015 Hoshino et al. ................ 370/312
(Continued)

FOREIGN PATENT DOCUMENTS

KR 10-2010-0003358 1/2010
KR 10-2011-0055014 5/2011

OTHER PUBLICATIONS

IEEE, "Part 16: Air Interface for Fixed and Mobile Broadband Wireless Access Systems, Multihop Relay Specification," Draft Amendment to IEEE Standard for Local and metropolitan area networks, IEEE P802316j/D3, 286 pages, (2008).

(Continued)

*Primary Examiner* — Meless Zewdu
(74) *Attorney, Agent, or Firm* — Nelson Mullins Riley & Scarborough LLP; Anthony A. Laurentano; Michael Malone

(57) ABSTRACT

Disclosed is a cellular communication system allowing direct communication between terminals within a cell or simultaneous transmission and reception of signals between a base station and the terminals through a repeater to be made by introducing a universal link, and a communication method thereof. The communication method of the cellular communication system includes: transmitting, by a base station, universal link setting information and a transmission control signal to a first terminal within a cell, transmitting, by the base station, the universal link setting information and a reception control signal to a second terminal within the cell, and directly transmitting/receiving, by the first and second terminals, signals through the universal link.

8 Claims, 5 Drawing Sheets

(51) Int. Cl.
  *H04W 72/04* (2009.01)
  *H04W 16/26* (2009.01)

(56) References Cited

U.S. PATENT DOCUMENTS

| | | | |
|---|---|---|---|
| 2002/0044549 A1* | 4/2002 | Johansson et al. | 370/386 |
| 2005/0036469 A1* | 2/2005 | Wentink | 370/338 |
| 2005/0143143 A1* | 6/2005 | Schwartz et al. | 455/574 |
| 2007/0019573 A1* | 1/2007 | Nishimura | 370/279 |
| 2008/0019423 A1* | 1/2008 | Hu | 375/141 |
| 2009/0017843 A1* | 1/2009 | Laroia et al. | 455/458 |
| 2009/0175214 A1* | 7/2009 | Sfar et al. | 370/315 |
| 2009/0181661 A1* | 7/2009 | Kitazoe et al. | 455/418 |
| 2010/0278123 A1* | 11/2010 | Fong | H04B 7/2656 370/329 |
| 2011/0117907 A1* | 5/2011 | Hooli et al. | 455/422.1 |
| 2012/0020213 A1* | 1/2012 | Horneman et al. | 370/231 |
| 2012/0163235 A1* | 6/2012 | Ho et al. | 370/254 |

OTHER PUBLICATIONS

Yun, Sangboh et al., "Hybrid Division Duplex System for Next-Generation Cellular Services," IEEE Transactions on Vehicular Technology, vol. 56(5):3040-3059 (2007).

* cited by examiner

CELLULAR COMMUNICATION SYSTEM ALLOWING, BY USING A UNIVERSAL LINK, DIRECT COMMUNICATION BETWEEN TERMINALS OR SIMULTANEOUS TRANSMISSION AND RECEPTION OF SIGNALS BETWEEN A BASE STATION AND THE TERMINALS

CROSS-REFERENCE TO RELATED APPLICATIONS

This application is based on and claims priority from Korean Patent Application No. 10-2012-0067895, filed on Jun. 25, 2012, with the Korean Intellectual Property Office, the disclosure of which is incorporated herein in its entirety by reference.

TECHNICAL FIELD

The present disclosure relates to a technology for introducing a universal link so that uplink and downlink signals or other signals not belonging to the uplink or downlink may be simultaneously transmitted in a cellular communication system.

BACKGROUND

A cellular communication system is a communication system which controls communications of terminals within a predetermined region (cell) around a base station. In an existing general cellular communication system, signals transmitted from the base station to the terminal are transmitted through a downlink, and signals transmitted from the terminal to the base station are transmitted through an uplink. In the above-mentioned uplink and downlink, a frequency division duplex mode in which division of a frequency domain is made in the same time domain or a time division duplex mode in which division of a time domain is made in the same frequency domain is used.

Up to now, in the cellular communication system, only transmission of signals between the base station and the terminals through the uplink and the downlink has been discussed. However, the case in which communication is directly made between the terminals within the same cell or the base station and the terminals simultaneously transmit or receive signals via a repeater may also be considered.

However, as illustrated in FIG. 1, in the existing cellular communication system, in the case in which communication is made between a first terminal 101 and a second terminal 103 within the same cell (for example, in the case in which the first terminal 101 transmits a signal to the second terminal 103), the signal is transmitted twice via the base station 100, that is, once through the uplink from the first terminal 101 to the base station 100 and once through the downlink from the base station 100 to the second terminal 103. Therefore, double time and frequency bands are required as compared to the case in which communication is directly made between the first and second terminals 101 and 103.

SUMMARY

The present disclosure has been made in an effort to provide a cellular communication system allowing direct communication between terminals within a cell or simultaneous transmission and reception of signals between a base station and the terminals through a repeater to be made by introducing a universal link, instead of a mode in which the terminals and the base station transmit/receive the signals through an uplink and a downlink, and a communication method thereof.

An exemplary embodiment of the present disclosure provides a communication method of a cellular communication system, including: transmitting, by a base station, universal link setting information and a transmission control signal to a first terminal within a cell, transmitting, by the base station, the universal link setting information and a reception control signal to a second terminal within the cell, and directly transmitting/receiving, by the first and second terminals, signals through the universal link.

Another exemplary embodiment of the present disclosure provides a communication method of a cellular communication system, including: transmitting, by a base station, a universal link setting information to a repeater and a terminal within a cell, simultaneously receiving, by the repeater, signals from the base station and the terminal through the universal link, and simultaneously transmitting, by the repeater, the received signals to the terminal and the base station through the universal link.

The universal link may be set in a specific wireless resource region regardless of the position of the cell or dynamically set according to the position of the cell and be set in a specific frequency domain and/or a specific time domain.

According to the present disclosure, it is possible to implement the cellular communication system allowing the direct communication between the terminals within the cell or simultaneous transmission and reception of the signals between the base station and the terminal through the repeater to be made by introducing the universal link. Therefore, it is possible to improve utilization efficiency of wireless resources (a frequency, and a time) and a transmission/reception speed of the signal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Figure 1:
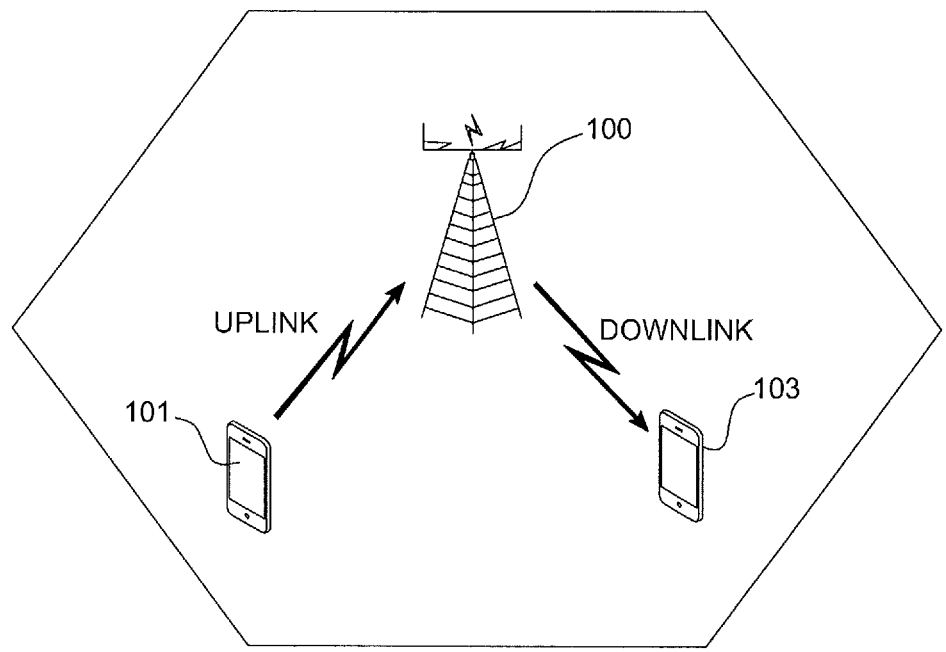
FIG. 1 is a view showing a communication process between terminals within a cell in an existing cellular communication system.
Figure 2A:
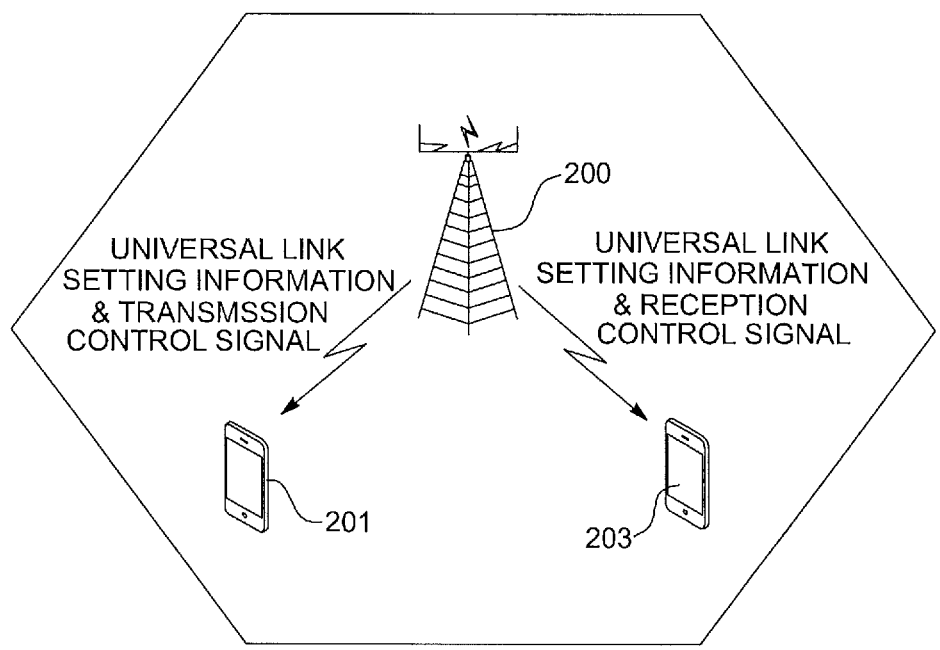
FIGS. 2A and 2B are views showing a direct communication method between terminals of a cellular communication system according to an exemplary embodiment of the present disclosure.
Figure 2B:
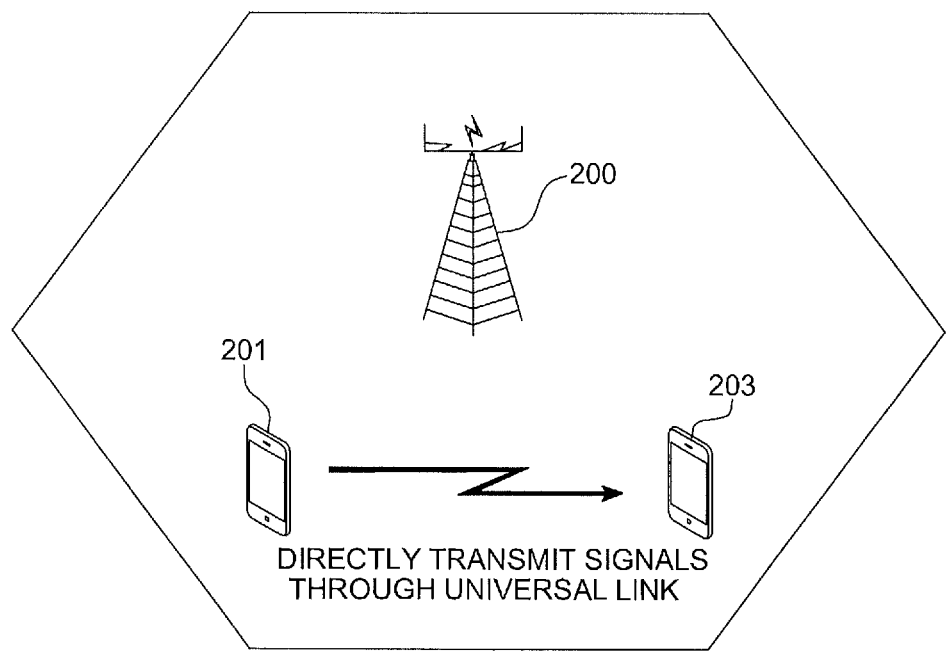

FIGS. 2A and 2B are views showing a direct communication method between terminals of a cellular communication system according to an exemplary embodiment of the present disclosure.

Referring to FIGS. 2A and 2B, in order to transmit directly signals from a first terminal 201 to a second terminal 203, a base station 100 first transmits universal link setting information and a transmission control signal to the first terminal 201 and transmits the universal link setting information and a reception control signal to the second terminal 203 (see FIG. 2A). Here, the position information on universal links is set to the first and second terminals 201 and 203, that is, the position in frequency and time domain, is the same for the first and second terminals 201 and 203. Meanwhile, the first and second terminals 201 and 203 are informed of whether they transmit or receive the signal by the control signals.

Then, the first and second terminals 201 and 203 receiving the transmission and reception control signals, respectively, transmit/receive the signals at predetermined time and frequency in response to the transmission and reception control signals (see FIG. 2B).

In the direct communication method between the terminals within the cell as described above, a process of transmitting a data signal between the base station 200 and the first and second terminals 201 and 203 is omitted, thereby improving utilization efficiency of wireless resources and reducing a signal transmission time.

Figure 3A:
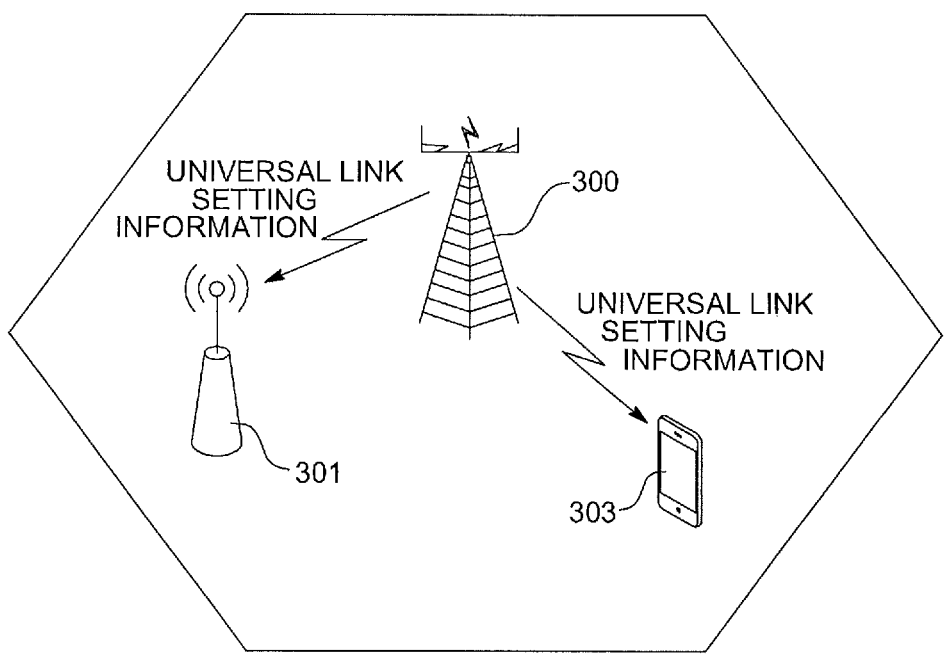
FIGS. 3A to 3C are views showing a communication method through a repeater of the cellular communication system according to the exemplary embodiment of the present disclosure.
Figure 3B:
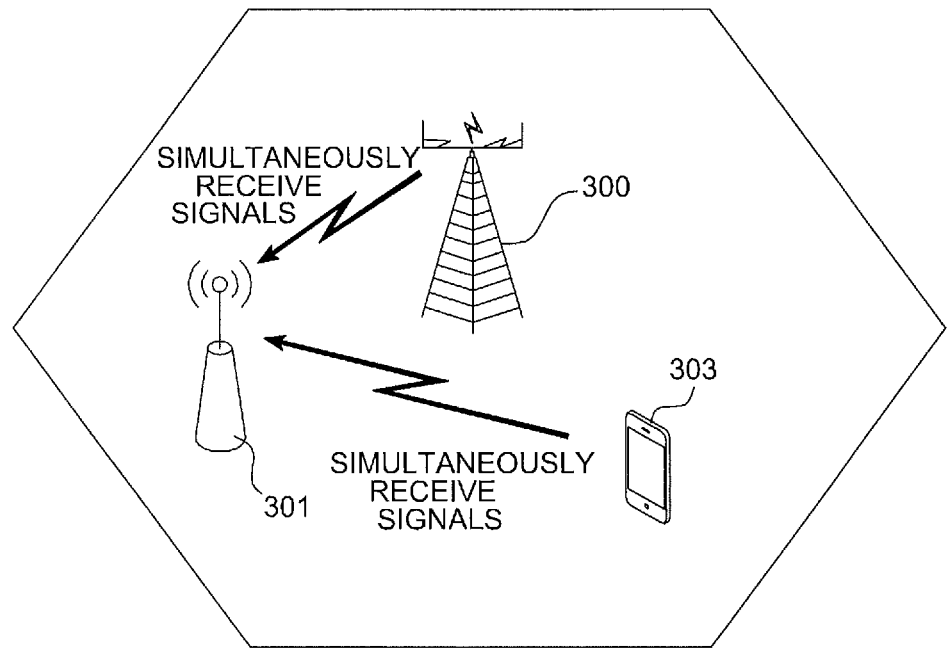
Figure 3C:
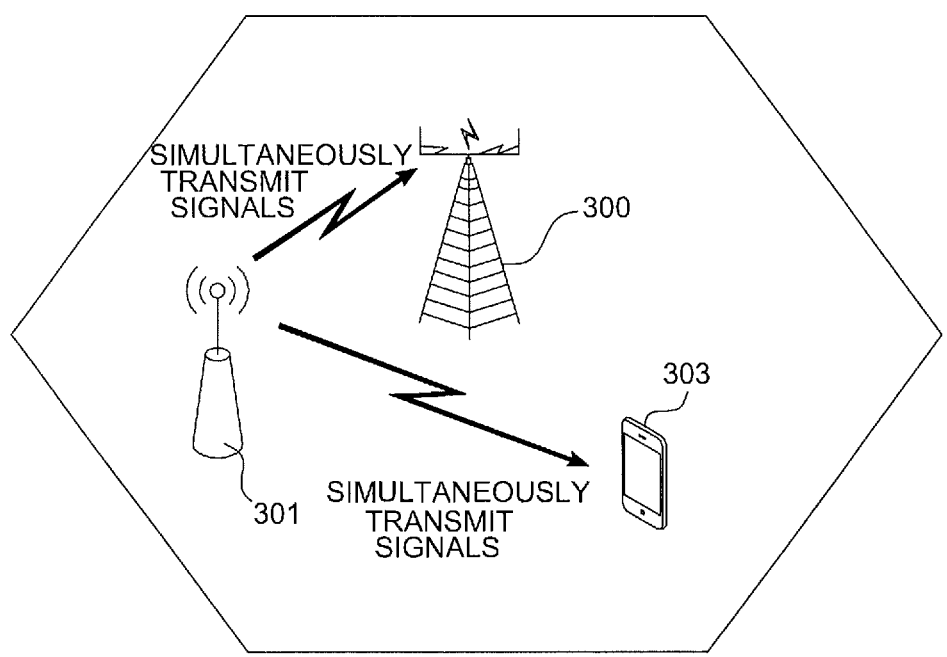

FIGS. 3A to 3C are views showing a communication method through a repeater of a cellular communication system according to the exemplary embodiment of the present disclosure, and the role of a repeater may be taken by a terminal.

Referring to FIGS. 3A to 3C, in order for a base station 300 and a terminal 303 to share wireless resources to simultaneously transmit/receive signals, the base station 300 first transmits universal link setting information to a repeater 301 and the terminal 303 (see FIG. 3A). In this case, position information of resources at which signals are to be transmitted, transmitting/receiving information, transmission/reception control signals, or the like, may be transmitted together with the universal link setting information.

Then, the repeater 301 may simultaneously receive signals from the base station 300 and the terminal 303 (see FIG. 3B) or simultaneously transmit the received signals to the base station 300 and the terminal 303 (see FIG. 3C), according to the control signals.

An actual application example of this technique may include analog network coding. In the analog network coding, the repeater 301 simultaneously transfers the signals received simultaneously from the base station 300 and the terminal 303 to the base station 300 and the terminal 303, thereby improving transmission efficiency of the signals.

Figure 4A:
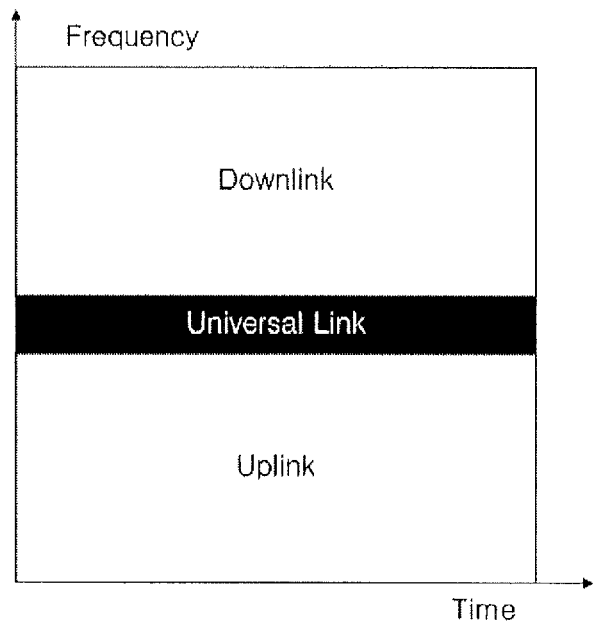
FIGS. 4A to 4C are views illustrating examples in which a universal link according to the present disclosure is set.
Figure 4B:
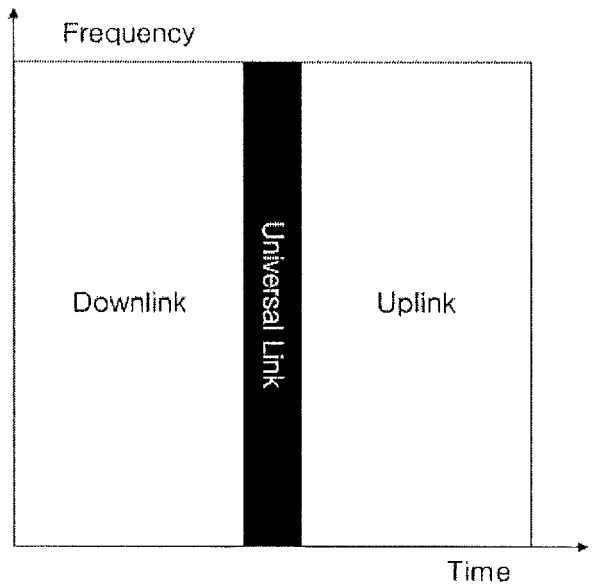
Figure 4C:
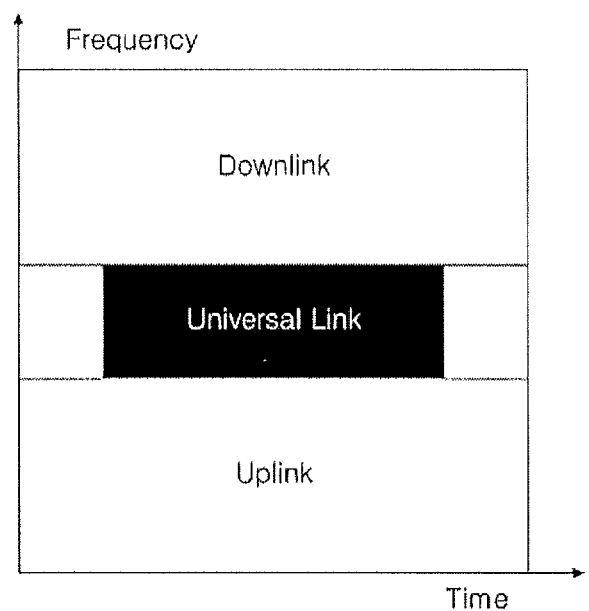

FIGS. 4A to 4C are views showing examples in which a universal link according to the present disclosure is set.

According to the present disclosure, the universal link may be set in a specific frequency band between the uplink and the downlink as shown in FIG. 4A, set in a specific time domain as shown in FIG. 4B, or set in a part of specific frequency and specific time domain as shown FIG. 4C.

Meanwhile, the universal link may be statically set in a specific frequency domain and/or a specific time domain regardless of a position of a cell, or be dynamically set according to the position of the cell. In the case in which the position of the universal link is statically set in the frequency and time domain, an inter-cell interference may be generated in the universal link; however a system may be simply configured. On the other hand, in the case in which the position of the universal link is dynamically set in the frequency and time domain, complexity of the system may increase; however, the universal links of two cells are set so as not to be overlapped with each other according to the positions of transmitters or receivers in the cells, thereby preventing the inter-cell interference from being generated.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A communication method of a cellular communication system, comprising:

transmitting, by a base station, a universal link setting information and a transmission control signal to a first terminal within a cell;

transmitting, by the base station, the universal link setting information and a reception control signal to a second terminal within the cell; and directly transmitting/receiving, by the first and second terminals, signals through a universal link, wherein the universal link setting information includes frequency domain information and time domain information, wherein the frequency domain information and the time domain information in the universal link setting information transmitted to each of the first terminal and the second terminal are the same, and wherein the signals transmitted/received through the universal link are in a specific frequency band between an uplink frequency band and a downlink frequency band used by the first terminal and the second terminal.

2. The communication method of claim 1, wherein the universal link is set in a specific wireless resource region regardless of positions of the first and second terminals in the cell, or dynamically set according to the positions of the first and second terminals in the cell.

3. The communication method of claim 1, wherein the universal link is set in a specific frequency domain and/or a specific time domain.

4. A communication method of a cellular communication system, comprising:

transmitting, by a base station, a universal link setting information to a repeater and a terminal within a cell;

simultaneously receiving, by the repeater and the terminal, signals from the base station through a universal link; and simultaneously transmitting, by the repeater and the terminal, signals to the base station through the universal link, wherein the universal link setting information includes frequency domain information and time domain information, wherein the frequency domain information and the time domain information in the universal link setting information transmitted to each of the repeater and the terminal are the same, and wherein the signals transmitted and the signals received through the universal link are in a specific frequency band between an uplink frequency band and a downlink frequency band used by the repeater and the terminal.

5. The communication method of claim 4, wherein the universal link is set in a specific wireless resource region regardless of a position the repeater in the cell, or dynamically set according to the position the repeater in the cell.

6. The communication method of claim 4, wherein the universal link is set in a specific frequency domain and/or a specific time domain.

7. A cellular communication system, comprising:
a base station and two or more terminals within a cell,
wherein the base station sets a universal link for direct communication between the two or more terminals in a specific wireless resource region, and transmits a transmission control signal or a reception control signal together with a universal link setting information to the two or more terminals, and
the two or more terminals transmit signals through the universal link in response to the transmission control signal or receive signals through the universal link in response to the reception control signal at a predetermined time and a predetermined frequency in response to the universal link setting information,
wherein the signals transmitted and the signals received through the universal link are in a specific frequency band between an uplink frequency band and a downlink frequency band used by the two or more terminals.

8. A cellular communication system comprising a base station, a repeater, and a terminal within a cell,
wherein the base station sets a universal link for sharing wireless resources with the terminal in a specific wireless resource region and transmits universal link setting information to the repeater and the terminal,
the repeater and the terminal simultaneously receives signals from the base station through the universal link at a predetermined time and a predetermined frequency in response to the universal link setting information and simultaneously transmits the signals to the terminal and the base station through the universal link at a predetermined time and a predetermined frequency in response to the universal link setting information, and
wherein the signals transmitted and the signals received through the universal link are in a specific frequency band between an uplink frequency band and a downlink frequency band used by the repeater and the terminal.

* * * * *